W. C. GOSS.
NUT LOCK.
APPLICATION FILED SEPT. 26, 1914.
1,149,043.
Patented Aug. 3, 1915.
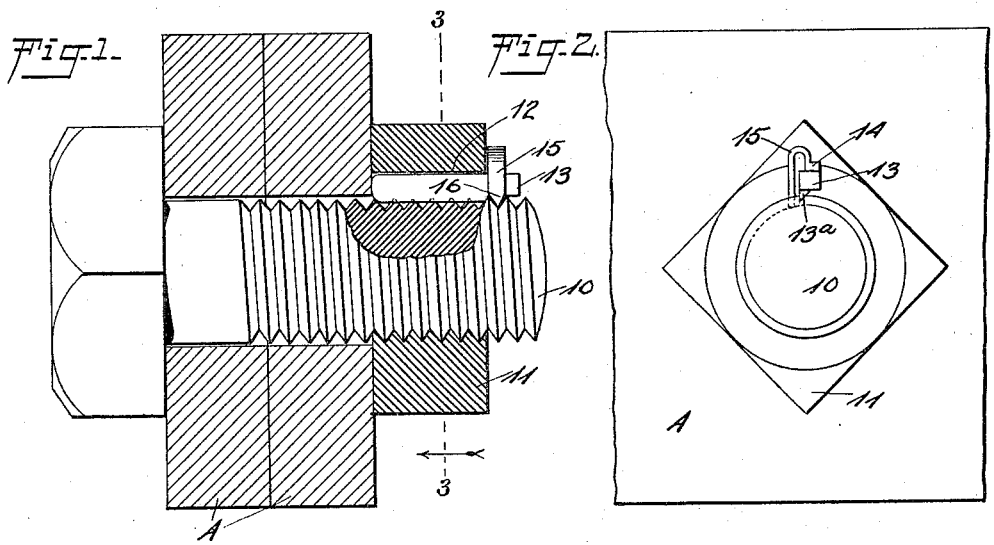
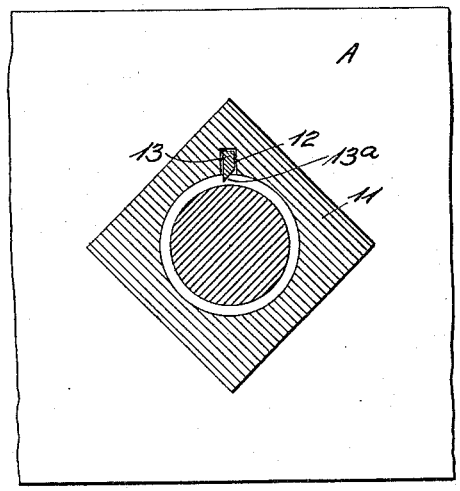
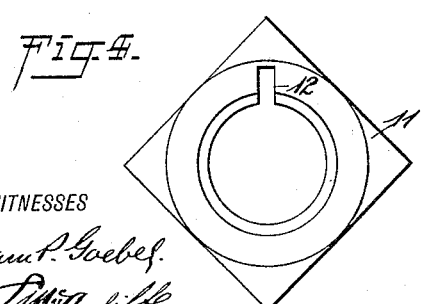
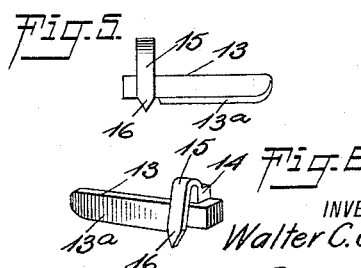
WITNESSES
William P. Goebel.
J. L. McAuliffe
INVENTOR
Walter C. Goss
BY Munn & Co.
ATTORNEYS

UNITED STATES PATENT OFFICE.

WALTER COLUMBUS GOSS, OF MARCUS, WASHINGTON.

NUT-LOCK.

1,149,043.   Specification of Letters Patent.   Patented Aug. 3, 1915.

Application filed September 26, 1914. Serial No. 863,618.

*To all whom it may concern:*

Be it known that I, WALTER C. GOSS, a citizen of the United States, and a resident of Marcus, in the county of Stevens, State of Washington, have invented a new and Improved Nut-Lock, of which the following is a full, clear, and exact description.

My invention is more particularly adapted to nuts of the type provided with a longitudinal groove complementary to the bore or eye of the nut for receiving a locking key.

Objects of my invention are to provide a nut locking key of simple form, having a novel means to engage the bolt; to provide a key that may be readily applied, and which will securely hold the nut against turning; and to provide a key, the bolt engaging means of which may be quickly released when it is desired to remove the nut.

The invention will be particularly explained in the specific description following.

Figure 1 is a side elevation partly in section showing my improved nut lock applied; Fig. 2 is a front end view; Fig. 3 is a cross section on the line 3—3 Fig. 1; Fig. 4 is a front view of the nut; Fig. 5 is a side view of the key; and Fig. 6 is a perspective view thereof.

In practice, the invention is employed in connection with any approved form of bolt 10, the nut 11 of which has a longitudinal groove 12 complementary to the eye or bore of the nut. The nut and bolt are adapted to clamp any members A A here conventionally shown.

To lock the nut on the bolt I provide a key 13, the body of which is accommodated in the groove 12 of the nut. The width of the key 13 is slightly greater than the transverse depth of the groove 12, and the forward edge 13$^a$ of the key is sharpened, the result being that when the key is driven endwise into the groove of the nut after the latter has been applied to the bolt 10, the sharp projecting edge of the key will cut a slight groove across the adjacent threads on the bolt, so as to hold the bolt against turning.

In order to further insure the locking of the nut on the bolt, the key is provided with a lateral arm 14 at the back or inner edge thereof, said arm being thickened at its base, as clearly shown in the drawing, giving it strength at this point. The arm is of reduced thickness beyond the base, as at 15, and is returned on itself to dispose its free end 16 beyond the front sharpened edge 13$^a$. The said free end 16 is sharpened or pointed and the arm is sufficiently flexible to respond to a blow against the bend thereof, so as to force the free end into the bolt between threads thereof.

The provision of the sharpened edge and the flexible, transverse locking arm to be driven into engagement with the bolt, coact to insure the locking of the nut against turning. At the same time, when it is desired to remove the nut, the arm 15 may be distorted by any convenient tool, so as to withdraw such arm from engagement with the bolt and permit the key to be withdrawn lengthwise.

Having thus described my invention, what I claim as new and desire to secure by Letters Patent, is:

1. In a nut lock for locking a grooved nut to a bolt, a key adapted to fit the groove of the nut, said key having bolt engaging means comprising a lateral arm on the key at the outer edge thereof to overlap the face of a nut, the said arm being returned laterally on itself to dispose its free end adjacent the front edge of the key and to permit the said arm to be driven laterally against the bolt.

2. In a nut lock for locking a grooved nut to a bolt, a key adapted to be received in the groove of the nut, said key having its front longitudinal edge sharpened to cut its way into a bolt, and a lateral arm on the key at the back thereof, the said arm being return bent and extending to the front edge of the key, and adapted to be driven against the bolt by a blow at the bend of the arm.

In testimony whereof I have signed my name to this specification in the presence of two subscribing witnesses.

WALTER COLUMBUS GOSS.

Witnesses:
LEROY S. MUNGER,
JOHN H. THOMAS.

Copies of this patent may be obtained for five cents each, by addressing the "Commissioner of Patents, Washington, D. C."